(12) United States Patent
Braunstorfinger

(10) Patent No.: US 11,428,776 B2
(45) Date of Patent: Aug. 30, 2022

(54) SYSTEM FOR MEASURING PHASE COHERENCE AS WELL AS METHOD OF MEASURING PHASE COHERENCE

(71) Applicant: Rohde & Schwarz GmbH & Co. KG, Munich (DE)

(72) Inventor: Thomas Braunstorfinger, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 751 days.

(21) Appl. No.: 16/356,673

(22) Filed: Mar. 18, 2019

(65) Prior Publication Data

US 2020/0300966 A1    Sep. 24, 2020

(51) Int. Cl.
    *G01S 7/288*    (2006.01)
    *H04B 17/364*    (2015.01)
    *H04B 17/23*    (2015.01)
    *H04B 17/21*    (2015.01)

(52) U.S. Cl.
    CPC .............. *G01S 7/288* (2013.01); *H04B 17/21* (2015.01); *H04B 17/23* (2015.01); *H04B 17/364* (2015.01); *G01S 7/2886* (2021.05)

(58) Field of Classification Search
    CPC ...... G01S 7/288; G01S 13/878; G01S 7/4008; G01S 7/2886; H04B 17/21; H04B 17/309; H04B 17/23; H04B 17/364
    See application file for complete search history.

(56) References Cited

U.S. PATENT DOCUMENTS

| 8,107,551 B2* | 1/2012 | Monnerie | H04L 27/265 375/269 |
| 8,686,894 B2* | 4/2014 | Fukuda | G01S 3/48 342/107 |
| 9,372,259 B2* | 6/2016 | Kishigami | G01S 13/288 |

OTHER PUBLICATIONS

Peihua Zhang, "A new DSP method for group delay measurement," in IEEE Transactions on Instrumentation and Measurement, vol. 40, No. 1, pp. 13-18, Feb. 1991, doi: 10.1109/19.69941 (Year: 1991).*

* cited by examiner

*Primary Examiner* — Peter M Bythrow
*Assistant Examiner* — Oladimeji Oyegunle
(74) *Attorney, Agent, or Firm* — Schwabe Williamson & Wyatt

(57) ABSTRACT

A system for measuring phase coherence between two modulated radio frequency signals comprises at least two measurement receivers coupled with each other and a processing module assigned to the at least two measurement receivers. Each of the at least two measurement receivers is configured to acquire a radio frequency signal and to convert the respective radio frequency signal acquired into digital samples. The processing module is configured to receive the digital samples and to transform the digital samples into a frequency domain to obtain a respective transformed dataset assigned to each measurement receiver. The processing module is also configured to calculate a phase in dependency of the frequency from the respective transformed dataset. Moreover, the processing module is configured to determine a phase difference over frequency based on the transformed datasets. Further, a method of measuring phase coherence between two modulated radio frequency signals is described.

18 Claims, 2 Drawing Sheets

SYSTEM FOR MEASURING PHASE COHERENCE AS WELL AS METHOD OF MEASURING PHASE COHERENCE

FIELD OF THE DISCLOSURE

Embodiments of the present disclosure relate generally to a system for measuring phase coherence between two modulated radio frequency signals. Further, embodiments of the present disclosure relate generally to a method of measuring phase coherence between two modulated radio frequency signals.

BACKGROUND

Modern radio frequency (RF) applications, such as multi-antenna communication, radar and beamforming systems, require the synchronous transmission of two or more radio frequency signals. In practice, imperfections in the hardware may result in unwanted timing, gain and phase differences between the radio frequency signals. Such differences have to be measured accurately in order to calibrate the respective system for correct operation.

In the state of the art, phase coherence of the radio frequency signals can be determined by using a system that comprises a (vector) network analyzer. The radio frequency signals received by the network analyzer are analyzed in order to determine the phase coherence of the radio frequency signals. However, the system known so far can only handle radio frequency signals being continuous waves (CW). Furthermore, a (vector) network analyzer is expensive such that measuring the phase coherence of the radio frequency signals incurs high costs.

Alternatively, it is known to use an oscilloscope instead of the (vector) network analyzer for measuring the phase coherence of the radio frequency signals. However, the oscilloscope can only be used for radio frequency signals with high power. Thus, the field of application is also limited when using the oscilloscope for processing the radio frequency signals. However, oscilloscopes are also expensive such that the overall costs of the system are still high.

Accordingly, there is a need for a system as well as a method for measuring a phase coherence of at least two modulated radio frequency signals in a wider field of application at relatively low costs.

SUMMARY

To address this need, the present disclosure provides a system for measuring phase coherence between two modulated radio frequency signals. The system comprises at least two measurement receivers coupled with each other and a processing module assigned to the at least two measurement receivers. Each of the at least two measurement receivers is configured to acquire a radio frequency signal and to convert the respective radio frequency signal acquired into digital samples. The processing module is configured to receive the digital samples and to transform the digital samples into a frequency domain to obtain a respective transformed dataset assigned to each measurement receiver. The processing module is configured to calculate a phase in dependency of the frequency from the respective transformed dataset. The processing module is further configured to determine a phase difference over frequency based on the transformed datasets.

Further, the present disclosure provides a method of measuring phase coherence between two modulated radio frequency signals, with the following steps:

Coupling at least two measurement receivers with each other, and

Acquiring, via each of the at least two measurement receivers, a radio frequency signal, Converting, via each of the at least two measurement receivers, the respective radio frequency signal acquired into digital samples, Receiving, via the processing module, the digital samples, Transforming the digital samples into a frequency domain to obtain a respective transformed dataset assigned to each measurement receiver, Calculating a phase in dependency of the frequency from the respective transformed dataset, and Determining a phase difference over frequency based on the transformed datasets.

Accordingly, the system and the method ensure measuring a phase coherence of modulated radio frequency signals even at low powers of the respective radio frequency signals. The processing module performs a Fourier transform of the radio frequency signals received, namely the previously obtained digital samples, such that a respective transformed dataset is obtained for each radio frequency signal processed by the respective measurement receiver. For instance, the Fourier transform may relate to a Fast Fourier Transform (FFT).

As the respective measurement receivers are each configured to convert the respective radio frequency signal acquired into digital samples, the processing module can process the respective digital samples afterwards in a digital manner in order to determine the phase difference over frequency between the radio frequency signals processed by the respective measurement receivers. For this purpose, the processing module takes the corresponding digital samples into account in order to determine the phase over frequency or rather the relative phase (phase difference) of the radio frequency signals processed by the measurement receivers. Thus, an expensive network analyzer is not necessary anymore.

In general, the system is configured to calculate the phases over frequency from the corresponding transformed datasets simultaneously.

The measurement receivers may relate to frequency selective power sensors that are configured to perform complex phase coherent measurements on 5G-NR/LTE/MCCW/CW signals, particularly signals with bandwidths up to 100 MHz. The system may ensure power measurements in the range of −130 dBm to +20 dBm for signals with a frequency range of 50 MHz to 6 Ghz.

According to an aspect, the at least two measurement receivers are synchronized with each other. Thus, the at least two measurement receivers may be synchronized with respect to a sample clock. For instance, a sample clock connection, a local oscillator connection as well as a trigger connection is established between the at least two measurement receivers. Moreover, one of the at least two measurement receivers may correspond to a master measurement receiver, whereas the other one corresponds to a slave measurement receiver. Put another way, the at least two measurement receivers have a master/slave relationship between each other.

In case of more than two measurement receivers, more than one measurement receiver corresponds to a slave measurement receiver.

According to another aspect, at least one data storage is provided that is connected with the at least two measurement receivers. The at least two measurement receivers are configured to forward the digital samples to the at least one data storage. Thus, the digital samples are at least temporarily stored in the data storage to be processed afterwards.

Particularly, the at least one data storage is connected with the processing module. The processing module is configured to access the at least one data storage in order to obtain the digital samples from the at least one data storage. Put another way, the digital samples are forwarded via the at least one data storage to the processing module.

For instance, each measurement receiver is assigned to its own data storage. Thus, at least two different data storages are provided that are assigned to the measurement receivers in an unambiguous manner. In other words, each measurement receiver is assigned to its own data storage.

For instance, each measurement receiver has an integrated data storage.

Moreover, each measurement receiver may have an integrated processing module. The processing modules may communicate with each other. Alternatively, a separately formed processing module is provided that is connected with the measurement receivers (via the at least one data storage).

The digital samples may correspond to in-phase and quadrature data (IQ data). Therefore, the measurement receivers are configured to convert the analog radio frequency signals into digital IQ data that is forwarded (via the at least one data storage) to the processing module.

Another aspect provides that each of the at least two measurement receivers is configured to determine the power of the radio frequency signal processed. Therefore, the power can be determined directly without the need of any additional measurement equipment.

Particularly, the system is configured to provide results about the phase difference and the power of the radio frequency signal processed simultaneously. In fact, the processing module outputs the results about the phase difference, as the processing module evaluates the transformed datasets obtained from the measurement receivers. The power of the radio frequency signal may be measured or rather determined by each respective measurement receiver for the radio frequency signal processed. The information assigned thereto may be forwarded to the processing module. Accordingly, the processing module may output the results about the phase difference and the respective power simultaneously.

In addition, each of the at least two measurement receivers may be configured to determine a modulation quality parameter of the modulated radio frequency signal processed. In other words, a transmitting performance parameter can be determined by the measurement receiver. The modulation quality parameter may correspond to an error vector magnitude (EVM).

For instance, the system is configured to provide results about the phase difference and the modulation quality parameter of the modulated radio frequency signal processed simultaneously. Again, the results about the phase difference determined by the processing module as well as the modulation quality parameter may be outputted by the system simultaneously without the need of any additional measurement equipment.

Moreover, the results about the phase difference, the modulation quality parameter as well as the power of the radio frequency signal may be provided simultaneously by the system.

The respective information may be outputted without any switching matrix that is assigned to the measurement receivers and/or the processing module.

In addition, the processing module may be configured to calculate a group delay from the transformed datasets based on the phases calculated. Accordingly, a delay of the at least two radio frequency signals processed by the system may also be determined simultaneously.

Again, the group delay, the modulation quality parameter, for instance the error vector magnitude, as well as the phase relationships may be determined simultaneously by the system.

Furthermore, the digital samples may comprise a time stamp. Thus, the processing module may easily compare the respective digital samples provided by the at least two measurement receivers. Thus, the respective phase information received by the respective measurement receiver may be compared with each other in order to determine the phase difference over frequency of the modulated radio frequency signals.

DESCRIPTION OF THE DRAWINGS

The foregoing aspects are many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
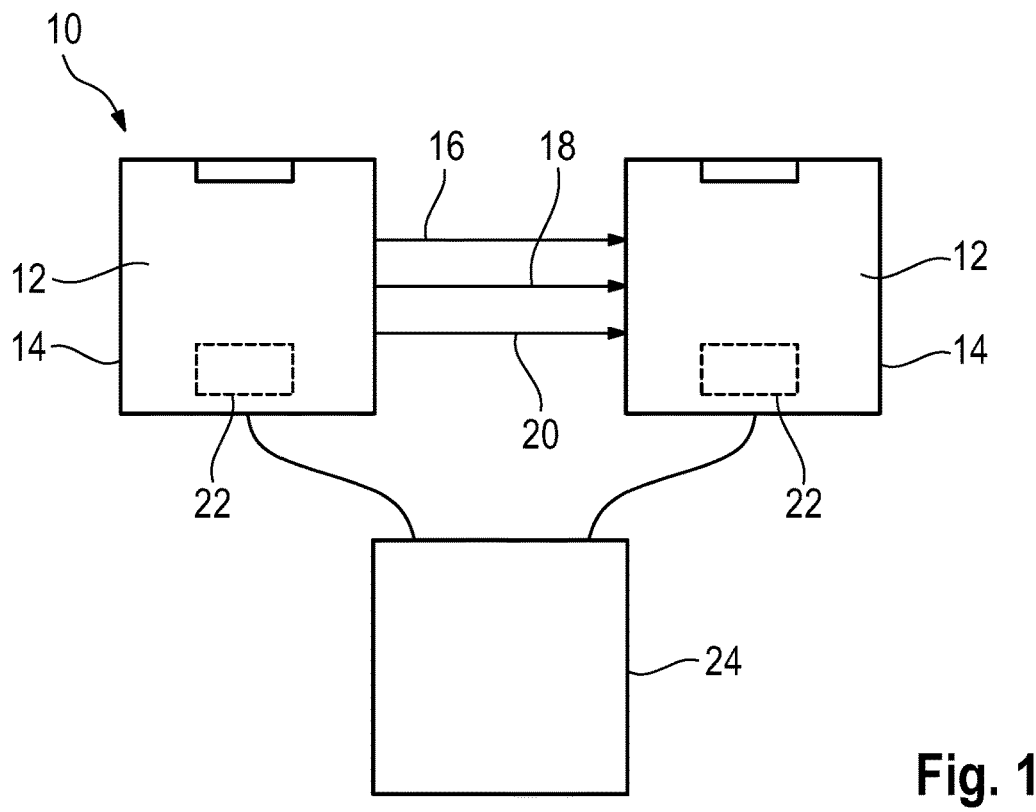
FIG. 1 schematically shows a system according to the present disclosure.

FIG. 1 shows a system 10 for measuring phase coherence between modulated radio frequency signals, which are received by at least two different measurement receivers 12.

The measurement receivers 12 are separately formed wherein the measurement receivers 12 each have a housing 14.

The at least two measurement receivers 12 are coupled with each other such that they are synchronized with each other. For this purpose, a sample clock connection 16, a local oscillator connection 18 as well as a trigger connection 20 is established between the at least two measurement receivers 12.

Particularly, the first measurement receiver 12 corresponds to a master measurement receiver whereas the second measurement receiver 12 corresponds to a slave measurement receiver.

The system 10 further comprises at least one data storage 22 that is connected with the at least two measurement receivers 12.

In the shown embodiment, two data storages 22 are provided that are assigned to the measurement receivers 12. In fact, each measurement receiver 12 has its own data storage 22 in an integrated manner, as the data storage 22 is located in the housing 14.

In addition, the system 10 comprises at least one processing module 24 that is assigned to the at least two measurement receivers 12 wherein the processing module 24 is connected with the data storages 22 such that the processing module 24 is enabled to access the data storages 22.

In the shown embodiment, the processing module 24 is separately formed. Alternatively, each of the measurement receivers 12 has its own processing module wherein the different processing modules communicate with each other.

Figure 2:
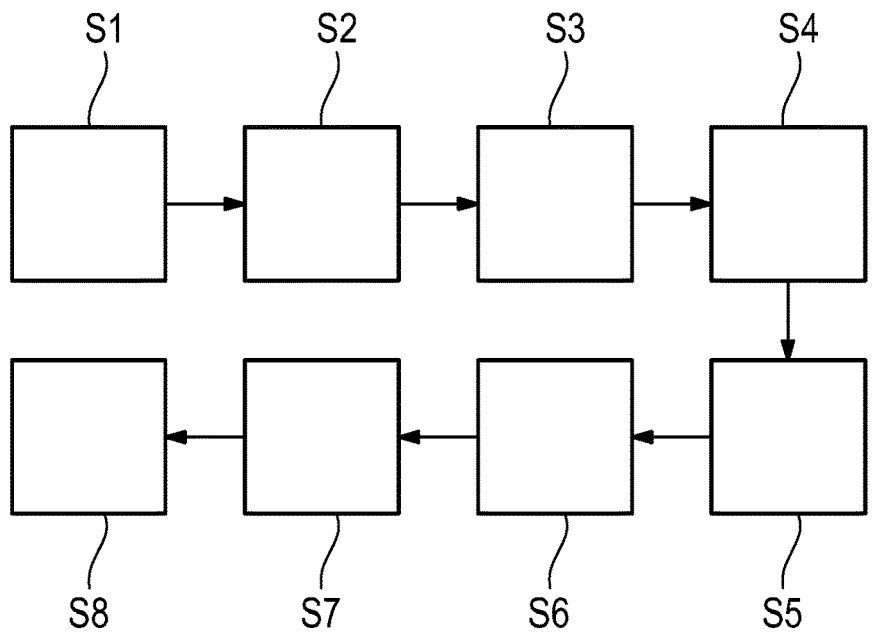
FIG. 2 shows a flow chart illustrating a method according to the present disclosure.

Generally, the system 10 is configured to determine a phase coherence over frequency of the modulated radio frequency signals processed. This is described hereinafter with reference to FIG. 2 that shows a flow-chart illustrating a method of measuring the phase coherence between two modulated radio frequency signals processed by the system 10.

In a first step S1, the at least two measurement receivers 12 are coupled with each other in order to synchronize them.

In a second step S2, the at least two measurement receivers 12 each receive and acquire a modulated radio frequency signal inputted.

In a third step S3, the measurement receivers 12 each convert the respective radio frequency signal acquired into digital samples, namely IQ data.

The measurement receivers 12 provide a time stamp for the digital samples, namely the IQ data, such that the respective IQ data or rather digital samples can be compared with each other with regard to time as will be described later.

In a fourth step S4, the IQ data generated by the respective measurement receivers 12 is forwarded to the data storages 22 so that the respective data may be at least temporarily stored in the respective data storage 22.

In a fifth step S5, the digital samples stored in the data storages 22 are forwarded to the processing module 24. Put another way, the processing module 24 may access the data storages 22 in order to retrieve the digital samples stored.

In a sixth step S6, the processing module 24 transforms the digital samples into a frequency domain to obtain a respective transformed dataset that is assigned to the respective measurement receiver 12. In other words, the digital samples provided by each measurement receiver 12 are transformed into the frequency domain by the processing module 24. For this purpose, the processing module 24 may apply a (Fast) Fourier Transform on the IQ data, namely the digital samples, so as to obtain the transformed dataset(s).

In a seventh step S7, the transformed dataset(s) are/is further processed by the processing module 24 in order to calculate a phase over frequency. Hence, the phase is calculated in dependency of the frequency by the processing module 24 for each radio frequency signal processed by the respective measurement receiver 12.

Since the processing module 24 calculates the phase over frequency for each transformed dataset, the processing module 24 is enabled to determine a phase difference over frequency based on the transformed datasets in an eighth step S8.

Therefore, the respective calculated phases over frequency are taken into account that are assigned to the radio frequency signals received by the at least two different measurement receivers 12.

Figure 3:
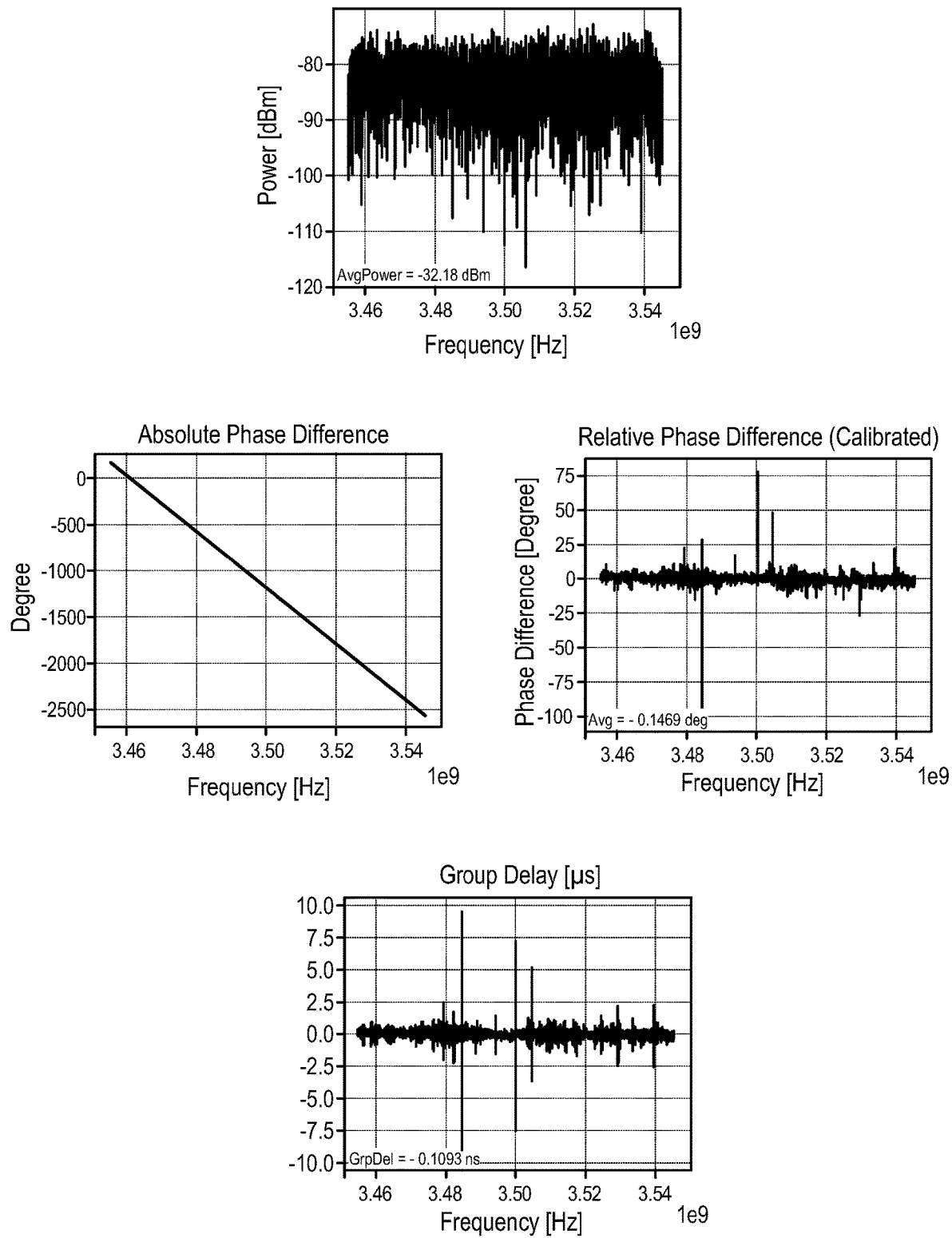
FIG. 3 shows an overview of different graphs illustrating parameters determined by the system such as power, phase difference and group delay.

Besides the phase difference over frequency calculated by the processing module 24, the system 10 is also configured to determine the power of the radio frequency signal processed by the respective measurement receiver 12, as shown in FIG. 3.

Furthermore, the system 10, particularly the processing module 24, calculates a group delay from the transformed datasets based on the phases calculated previously. This is also shown in FIG. 3.

In general, the system 10, particularly the respective measurement receiver 12, may calculate a modulation quality parameter such as the error vector magnitude of the radio frequency signals processed.

Hence, the information with regard to the power or rather the modulation quality parameter of the radio frequency signal may be determined by the measurement receiver 12 that processes the radio frequency signal.

Moreover, the system 10 is generally configured to provide the results about the phase difference over frequency determined by the processing module 24 as well as parameters assigned to the radio frequency signals processed, which are determined by the respective measurement receiver 12, namely the power, the modulation quality parameter such as the error vector magnitude or rather a group delay that was calculated from the transformed datasets based on the phases calculated previously. In fact, the system 10 may provide this information simultaneously.

Hence, the system 10 provides a simple and cost-efficient way to simultaneously measure at least two radio frequency signals with respect to their phase(s), (group) delay as well as modulation quality in a simultaneous manner.

The invention claimed is:

1. A system for measuring phase coherence between two modulated radio frequency signals, comprising at least two measurement receivers coupled with each other and a processing module assigned to the at least two measurement receivers, each of the at least two measurement receivers being configured to acquire a radio frequency signal and to convert the respective radio frequency signal acquired into digital samples, the processing module being configured to receive the digital samples of the at least two measurement receivers and to transform the digital samples for each of the at least two measurement receivers into a frequency domain to obtain a respective transformed dataset assigned to each measurement receiver, the processing module being configured to calculate a phase in dependency of the frequency from the respective transformed dataset, the processing module being configured to determine a phase difference over frequency based on the transformed datasets.

2. The system according to claim 1, wherein the at least two measurement receivers are synchronized with each other.

3. The system according to claim 1, wherein at least one data storage is provided that is connected with the at least two measurement receivers, the at least two measurement receivers being configured to forward the digital samples to the at least one data storage.

4. The system according to claim 3, wherein the at least one data storage is connected with the processing module, the processing module being configured to receive the digital samples from the at least one data storage.

5. The system according to claim 3, wherein each measurement receiver is assigned to its own data storage.

6. The system according to claim 1, wherein the digital samples correspond to in-phase and quadrature data.

7. The system according to claim 1, wherein each of the at least two measurement receivers is configured to determine the power of the radio frequency signal processed.

8. The system according to claim 7, wherein the system is configured to provide results about the phase difference and the power of the radio frequency signal, processed simultaneously.

9. The system according to claim 1, wherein each of the at least two measurement receivers is configured to determine a modulation quality parameter of the modulated radio frequency signal processed.

10. The system according to claim 9, wherein the system is configured to provide results about the phase difference and the modulation quality parameter of the modulated radio frequency signal, processed simultaneously.

11. The system according to claim 1, wherein the processing module is configured to calculate a group delay from the transformed datasets based on the phases calculated.

12. The system according to claim 1, wherein the digital samples comprise a time stamp.

13. A method of measuring phase coherence between two modulated radio frequency signals, with the following steps:
    coupling at least two measurement receivers with each other,
    acquiring, via each of the at least two measurement receivers, a radio frequency signal,
    converting, via each of the at least two measurement receivers, -the respective radio frequency signal acquired into digital samples,
    receiving, via a processing module, the digital samples of the at least two measurement receivers,
    transforming the digital samples into a frequency domain for each of the at least two measurement receivers to obtain a respective transformed dataset assigned to each measurement receiver,
    calculating a phase in dependency of the frequency from the respective transformed dataset, and
    determining a phase difference over frequency based on the transformed datasets.

14. The method according to claim 13, wherein the at least two measurement receivers are synchronized with each other.

15. The method according to claim 13, wherein the digital samples are forwarded to at least one data storage, the digital samples being transmitted via the at least one data storage, the digital samples being received by the processing module.

16. The method according to claim 13, wherein a group delay is calculated from the transformed datasets based on the phases calculated.

17. The method according to claim 13, wherein at least one of the power of the radio frequency signal processed and a modulation quality parameter of the radio frequency signal processed is calculated.

18. The method according to claim 17, wherein results about the phase difference and at least one of the power and the modulation quality parameter of the radio frequency signal processed are provided simultaneously.

* * * * *